Jan. 5, 1954

M. MORGAN ET AL 2,664,950

ROTARY SHEARS

Filed Nov. 9, 1950

INVENTORS
MYLES MORGAN
BY JOSEPH M. O'MALLEY

Albert G. Blodgett
ATTORNEY

INVENTORS
MYLES MORGAN
BY JOSEPH M. O'MALLEY

ATTORNEY

Jan. 5, 1954  M. MORGAN ET AL  2,664,950
ROTARY SHEARS
Filed Nov. 9, 1950  3 Sheets-Sheet 3

INVENTORS
MYLES MORGAN
BY JOSEPH M. O'MALLEY.

ATTORNEY

Patented Jan. 5, 1954

2,664,950

UNITED STATES PATENT OFFICE 2,664,950

ROTARY SHEARS

Myles Morgan and Joseph M. O'Malley, Worcester, Mass., assignors to Morgan Construction Company, Worcester, Mass., a corporation of Massachusetts Application November 9, 1950, Serial No. 194,906

7 Claims. (Cl. 164—60)

This invention relates to rotary shears, and more particularly to shears of the type having two cutting disks rotatable about substantially parallel axes and adapted to sever a longitudinally traveling metal rod or the like as it is deflected in a lateral direction between the disks.

With rotary shears of this type, the line of travel of the rod lines at an acute angle with the plane of the disks so that the cut can be made without interrupting the forward movement of the rod. After lateral deflection of the rod and resultant severance thereof it is necessary to separate the disks so that the rod can be deflected laterally between them in the other direction, and thus be returned to its original path of travel. For this purpose it has heretofore been the practice to mount the disks on shafts which rotate within eccentric sleeves, these sleeves being themselves rotatably adjustable to effect the desired separation of the disks. This prior construction is very difficult to lubricate properly. Furthermore, the rotary adjustment of the sleeves is usually brought about by means of electric motors, and in many instances the sleeves are not brought to rest in the exact positions required to ensure proper shearing action. Sharpening of the disks results in reducing the diameters thereof, and the prior shears do not provide adequate adjustments to compensate for such changes.

It is accordingly one object of the invention to provide a rotary disk shear which can be easily and properly lubricated.

It is a further object of the invention to provide a rotary disk shear having an accurate and dependable mechanism for moving the disks to and from one another.

It is a further object of the invention to provide a rotary disk shear which can be readily adjusted to compensate for changes in the diameters of the cutting disks.

With these and other objects in view, as will be apparent to those skilled in the art, the invention resides in the combination of parts set forth in the specification and covered by the claims appended hereto.

In accordance with the invention in its preferred form there are provided two substantially parallel shafts each supporting a cutting disk. Preferably the shafts are horizontal and located in a common vertical plane. Each shaft is rotatably supported in suitable bearings, and the bearings for each shaft are mounted in a separate housing. The upper housing, and preferably the lower housing also, is hinged to a supporting structure for a swinging movement in the vertical plane of the shaft axes. Thus the disks can be moved apart or together as required. In order to bring about this swinging movement a transverse horizontal shaft is rotatably mounted in the supporting structure, this shaft having an eccentric thereon which is connected by an upright pitman rod to a pin mounted in the upper housing. The shaft preferably has a second eccentric thereon, displaced 180 degrees from the first eccentric, and connected by an upright pitman rod to a pin mounted in the lower housing. The eccentric shaft can be rotated through approximately one-half a revolution by means of a reversible hydraulic motor which is connected to the shaft by a rack and pinion. The pins to which the pitman rods are connected are adjustable rotatably in their respective housings and provided with eccentric portions. By adjusting these pins it is possible to compensate for changes in the disk diameters.

Referring to the drawings illustrating one embodiment of the invention and in which like reference numerals indicate like parts, Fig. 1 is a side elevation of a rotary disk shear with the disks in the closed or cutting position, certain parts being broken away for clearness of illustration;

Figure 1:
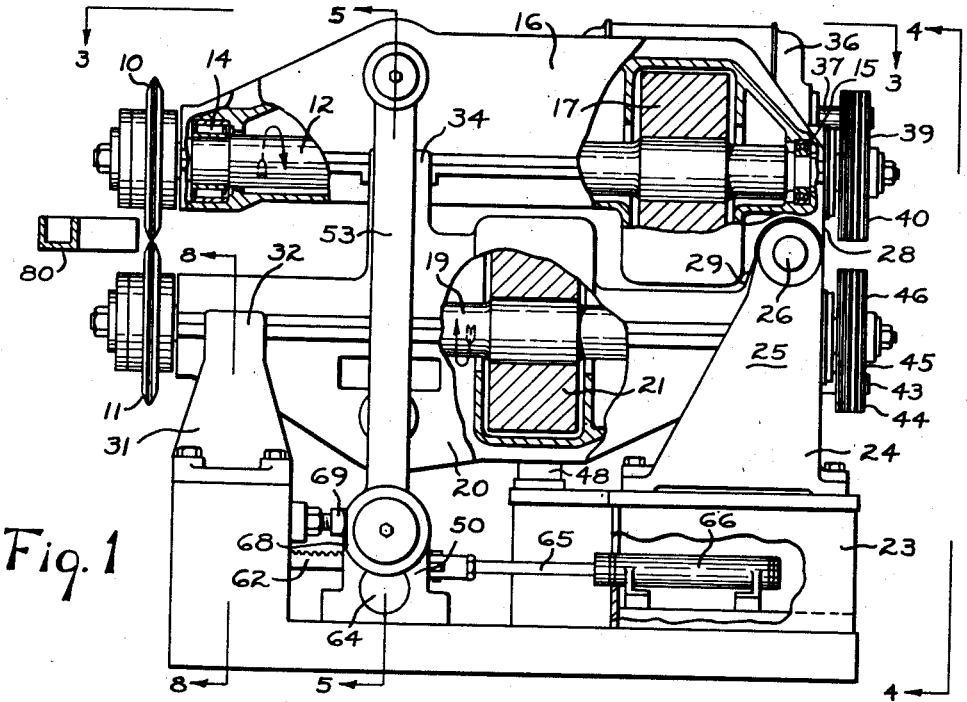

The embodiment illustrated comprises a pair of cooperating rotary cutting disks 10 and 11 mounted one above the other with their circular cutting edges located in a common vertical plane. The upper disk 10 is secured to the inner end portion of a horizontal shaft 12 which is rotatably supported in suitable antifriction bearings 14 and 15 mounted in a hollow upper housing 16. A flywheel 17 is mounted on this shaft. The lower disk 11 is secured to the inner end portion of a horizontal shaft 19 which is rotatably supported in suitable antifriction bearings (not shown) mounted in a hollow lower housing 20 located beneath the housing 16. A flywheel 21 is mounted on the lower shaft 19.

Figure 4:
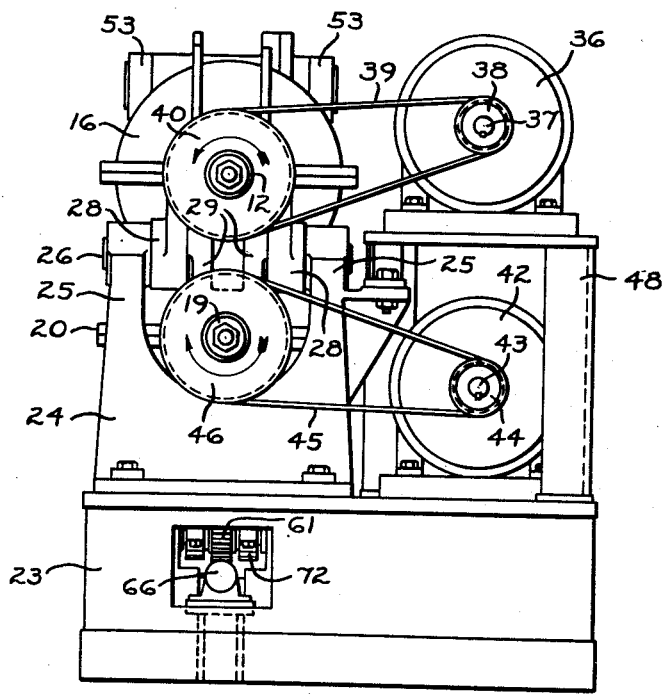
Fig. 4 is an end elevation of the shear as indicated by the line 4—4 of Fig. 1.

The shaft housings 16 and 20 are supported by a frame structure comprising a base 23 and a bracket 24 secured to the outer portion of the base. As best shown in Fig. 4, the bracket 24 is bifurcated to provide two laterally spaced branches 25 which project upwardly and support a horizontal hinge pin 26. Both the shaft housings are pivotally connected near their outer ends to the pin 26. The upper housing 16 has two laterally spaced lugs 28 thereon extending downwardly between the branches 25, and the lower housing 20 has two laterally spaced lugs 29 thereon extending upwardly between the lugs 28. The pin 26 extends through the lugs 28 and 29. Thus both shaft housings can swing in a vertical plane about the hinge pin 26. In order to guide the lower housing 20 a bracket 31 is mounted on the inner portion of the base 23, this bracket having two laterally spaced fingers 32 which extend upwardly on opposite sides of the housing 20 and in sliding contact therewith. Similarly, in order to guide the upper housing 16, the lower housing 20 is provided with two spaced fingers 34 which extend upwardly on opposite sides of the upper housing and in sliding contact therewith.

The two shafts 12 and 19 are suitably driven. For this purpose there is provided an electric motor 36 having a shaft 37 with a sheave 38 secured thereon, this sheave being connected by belts 39 to a sheave 40 secured to the outer end of the upper shaft 12. There is also provided an electric motor 42 having a shaft 43 with a sheave 44 secured thereon, this sheave being connected by belts 45 to a sheave 46 secured to the outer end of the lower shaft 19. The motor 36 is supported by a bracket 48 mounted on the base 23 at one side of the bracket 24. The motor 42 is supported directly on the base 23 beneath the motor 36.

The vertical swinging movements of the upper shaft housing 16 are brought about by a mechanism which will now be described. Two laterally spaced bearings 50 (Fig. 5) are provided on the top of the base 23 to support a transversely extending horizontal rotatable actuating shaft 51. The two opposite end portions 52 of this shaft extend beyond the bearings and are aligned with one another and eccentric with respect to the bearing-supported portions of the shaft. These eccentric portions 52 are respectively connected, by means of upright links or pitman rods 53, to the two opposite end portions 54 of a transverse horizontal pin 55 which is mounted in the upper housing 16 and extends therethrough in a position above the upper shaft 12. This pin 55 has a flange 57 integral therewith and formed with two arcuate slots 58 through which two screws 59 extend into the adjacent part of the housing 16. The end portions 54 are somewhat eccentric with respect to the main body of the pin. The shaft 51 can be turned through 180 degrees to bring the axes of the eccentrics 52 either directly beneath the axis of the shaft or directly above the same. For this purpose a spur gear 61 is secured to the central portion of the shaft, and this gear meshes with a horizontal rack 62 therebeneath, the rack resting on a transverse roller 63 supported at its ends in bearings 64. This rack is connected at its outer end to the piston rod 65 of a double-acting fluid motor or cylinder 66 mounted on the base 23. By means of a four-way valve (not shown) of any suitable and well-known type to control the flow of oil or other fluid to and from the opposite ends of the cylinder 66, the rack 62 can be moved inwardly and outwardly as desired. In order to limit the stroke of the rack, the lower portions of the links 53 are flattened on their inner sides at 68 (Figs. 1 and 2) to engage adjustable stops in the form of screws 69 mounted in the base 23.

Figure 5:
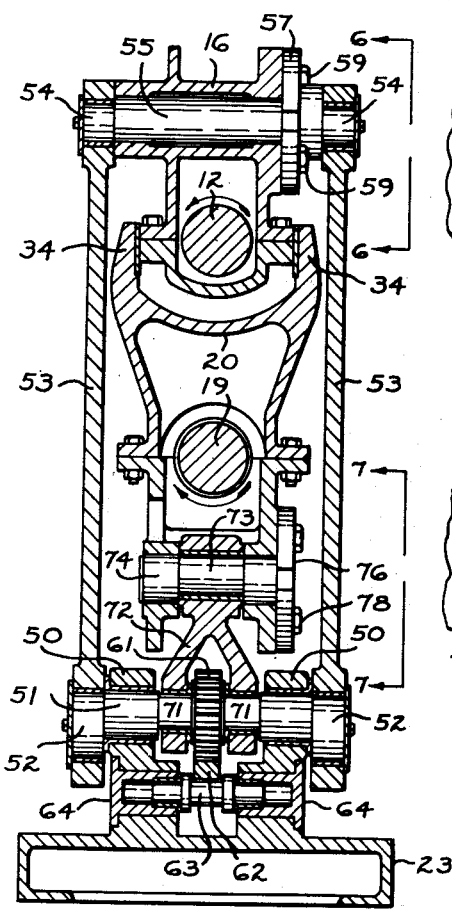
Fig. 5 is a section taken on the line 5—5 of Fig. 1.

The vertical swinging movements of the lower shaft housing 20 are also brought about by the shaft 51. As shown in Fig. 5, this shaft is provided with two portions 71 located on opposite sides of the gear 61, these portions being aligned with one another and eccentric with respect to the bearing-supported portions of the shaft. The portions 71 are preferably somewhat less eccentric than the portions 52, and displaced 180 degrees therefrom. A bifurcated upright link or pitman rod 72 connects the eccentric portions 71 to the central portion 73 of a transverse horizontal pin 74 which is supported at its ends in the lower shaft housing 20 and extends therethrough in a position below the shaft 19. This central portion 73 is somewhat eccentric with respect to the end portions of the pin. On one end of the pin there is provided a flange 76 having two arcuate slots 77 therein through which screws 78 extend into the housing 20.

The operation of the invention will now be apparent from the above disclosure. When the disks 10 and 11 are in the cutting position shown in Fig. 1, their circular cutting edges will be substantially tangent. The longitudinally traveling metal rod which is to be severed will be guided toward the shear by a suitable horizontal trough 80 arranged to be swung laterally in known manner. This trough preferably supports the rod so that the axis of the rod is approximately in the same horizontal plane as the point of tangency of the disks. The shafts 12 and 19 will be rotated by the motors 36 and 42 in the directions indicated by the arrows, and the trough 80 will normally be positioned as shown in full lines in Fig. 3, to direct the rod at an acute angle with the plane of the disks and somewhat to the right of their point of tangency. By swinging the trough to the position indicated in broken lines, the rod will be moved laterally between the disks and severed during such movement without interrupting its forward travel. As the cut takes place, the shaft housings 16 and 20 will be firmly supported against the cutting forces by means of the links 53 and 72. Since the eccentric portions 52 and 71 will be on dead center, there will be no tendency for the cutting forces to turn the shaft 51. Upon completion of the cut, the fluid motor 66 will be energized (either automatically or manually) to move the rack 62 to the position shown in Fig. 2. This will rotate the gear 61 and the shaft 51 through 180 degrees until the flat portions 68 on the links 53 again engage the stop screws 69. During this movement the eccentrics 52 will raise the links 53 and the upper shaft housing 16, while the eccentrics 71 will lower the link 72 and the lower shaft 20. This will separate the disks 10 and 11, so that the trough can then be shifted back to its normal position, at the same time moving the rod back between the disks. Thereupon the fluid motor 66 will be energized in the reverse direction to restore the rack 62 and the various other parts to the positions shown in Fig. 1, in readiness for the next cut.

Figure 6:
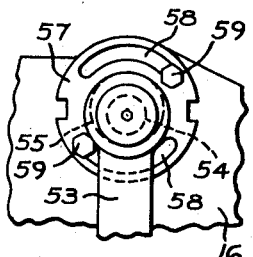
Fig. 6 is a fragmentary elevation taken as indicated by the line 6—6 of Fig. 5.
Figure 7:
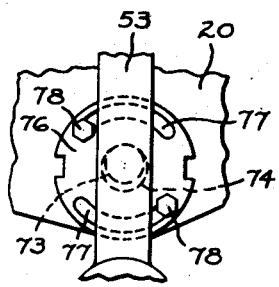
Fig. 7 is a fragmentary elevation taken as indicated by the line 7—7 of Fig. 5.
Figure 8:
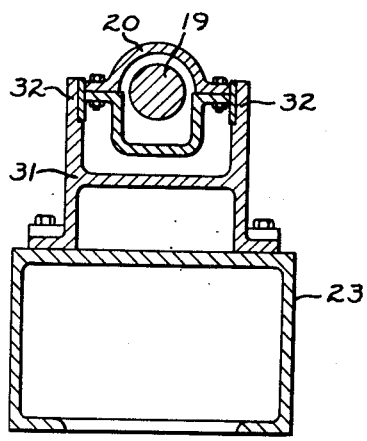
Fig. 8 is a section taken on the line 8—8 of Fig. 1.

It is important that the circular cutting edges of the two disks 10 and 11 be tangent when the disks are in the cutting position, and that the point of tangency be substantially in the same horizontal plane as the axis of the rod being sheared. The present invention makes it possible to bring this about by adjusting the height of each disk individually, thereby correcting for any change in the diameter of either disk, say by sharpening or otherwise. Thus it will be noted that the upper disk 10 can be adjusted by loosening the screws 59 (Figs. 5 and 6), turning the flange 57 as required, and then tightening the screws. The resultant movement of the eccentrics 54 will raise or lower the upper disk. Similarly, the lower disk 11 can be adjusted by loosening the screws 78 (Figs. 5 and 7), turning the flange 76 as required, and then tightening the screws. The resultant movement of the eccentric 73 will raise or lower the lower disk.

Figure 2:
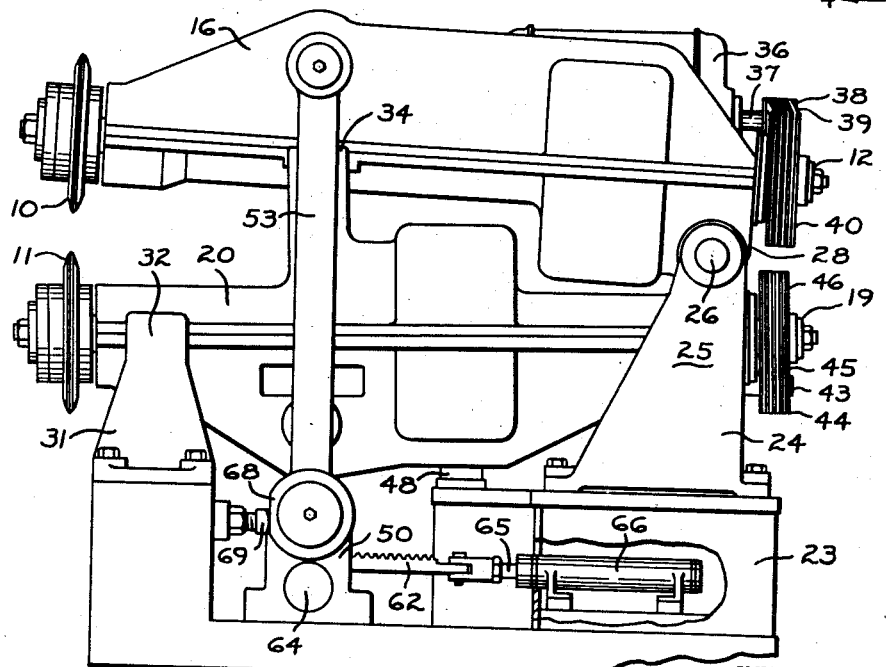
Fig. 2 is a view similar to Fig. 1, with the disks in the open position.
Figure 3:
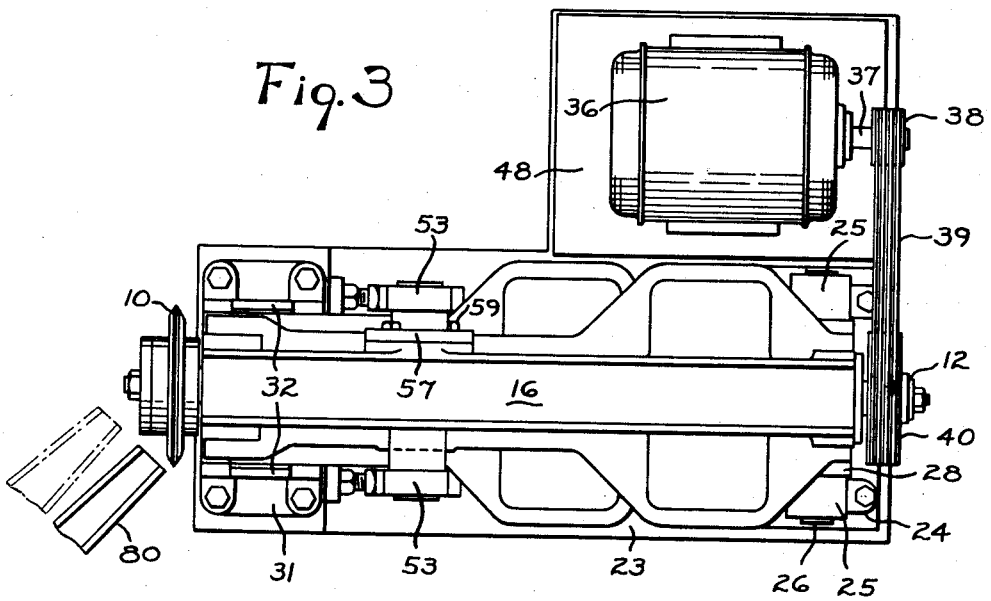
Fig. 3 is a top plan view of the shear, as indicated by the line 3—3 of Fig. 1.

The vertical swinging movements of the shaft housings 16 and 20 take place about the hinge pin 26. These housings are normally positioned as shown in Fig. 1, the sheaves 40 and 46 being located in a common plane with the sheaves 38 and 44, so that the belts 39 and 45 will drive the shafts 12 and 19 in the desired manner. During the brief intervals when the disks 10 and 11 are separated as shown in Fig. 2, the sheaves 40 and 46 are tilted slightly, but the belts 39 and 45 have ample flexibility to permit such tilting without interfering with the transmission of power to the disks. The flywheels 17 and 21 slow down slightly during each cut and give up energy to their respective shafts, thereby making it feasible to use somewhat less powerful motors than would otherwise be required. The bearings 14—15 for the upper shaft 16, as well as the corresponding bearings for the lower shaft 19, can be very readily lubricated and present no problems in that respect. The screws 69 can be easily adjusted to ensure that the eccentric shaft 51 will stop accurately on dead center when the disks 10—11 are moved to the cutting position.

Having thus described our invention, what we claim as new and desire to secure by Letters Patent is:

1. A rotary shear for severing a longitudinally traveling rod or the like comprising two substantially parallel rotatable shafts, two cutting disks mounted on the respective shafts and positioned at an acute angle with the line of rod travel, the disks having circular cutting edges arranged to cooperate in severing the rod as it is deflected laterally between the disks, driving means to rotate the shafts, a supporting structure, a housing rotatably supporting one of the shafts, hinge means connecting the housing to the supporting structure so that the housing may swing substantially in the plane of the shaft axes, an actuating shaft rotatably mounted in the supporting structure, an eccentric on the actuating shaft, means including a pitman rod connecting the eccentric to the said housing, and mechanism to turn the actuating shaft and thereby swing the housing about the hinge means as required to separate the disks and allow the rod to pass between them.

2. A rotary shear as set forth in claim 1, including a gear mounted on the actuating shaft, a reciprocal rack meshing with the gear, and a motor connected to the rack to reciprocate the same and thereby turn the actuating shaft.

3. A rotary shear as set forth in claim 1, in which the eccentric is located in one dead center position when the disks are in their cutting positions.

4. A rotary shear as set forth in claim 1, in which the pitman rod is connected to an eccentric portion on a pin, the pin being rotatably mounted in the housing, and means being provided to adjust the pin about its axis and thereby compensate for changes in the disk diameters.

5. A rotary shear for severing a longitudinally traveling rod or the like comprising two substantially parallel horizontal rotatable shafts located one above the other, two cutting disks mounted on the respective shafts and positioned at an acute angle with the line of rod travel, the disks having circular cutting edges arranged to cooperate in severing the rod as it is deflected laterally between the disks, two separate housings rotatably supporting the respective shafts, driving means to rotate the shafts, a supporting structure, hinge means connecting the housings to the supporting structure so that the housings may swing substantially in the vertical plane of the shaft axes, a horizontal actuating shaft rotatably mounted in the supporting structure, two eccentrics on the actuating shaft and displaced 180 degrees from one another, means including an upright pitman rod connecting one of the eccentrics to the upper housing, means including an upright pitman rod connecting the other eccentric to the lower housing, and mechanism to turn the actuating shaft and thereby swing the housings away from one another as required to separate the disks and allow the rod to pass between them.

6. A rotary shear as recited in claim 5, wherein: said mechanism to turn the actuating shaft includes a gear mounted on the actuating shaft, a reciprocal rack meshing with the gear, and a motor connected to the rack to reciprocate the same.

7. A rotary shear for severing a traveling rod or the like, comprising: two substantially parallel rotatable shafts, two cutting disks mounted at adjacent ends of the respective shafts, the disks having peripheral cutting edges arranged to cooperate in severing the rod, driving means to rotate the shafts, the shafts being mounted to swing about a hinge axis substantially perpendicular to the plane of the shaft axes and located adjacent the ends of the shafts opposite the ends on which the said disks are mounted, an actuating shaft rotatably mounted adjacent the medial portions of the shafts, at least two eccentrics on the actuating shaft, means connecting one of the eccentrics to one shaft and the other eccentric to the other shaft, and a mechanism connected to turn the actuating shaft and thereby swing the shafts in opposite directions about the said hinge axis as required to separate the disks.

MYLES MORGAN.
JOSEPH M. O'MALLEY.

References Cited in the file of this patent

UNITED STATES PATENTS

| Number | Name | Date |
|---|---|---|
| 1,811,986 | Young | June 30, 1931 |
| 2,170,255 | Sheperdson | Aug. 22, 1939 |

FOREIGN PATENTS

| Number | Country | Date |
|---|---|---|
| 18,694 | Great Britain | Aug. 19, 1911 |
| 505,135 | France | July 23, 1920 |
| 526,959 | France | July 15, 1921 |
| 538,219 | France | Mar. 15, 1922 |
| 89,785 | Sweden | July 20, 1937 |